H. M. BRANSON.
BLANK FORM.
APPLICATION FILED MAR. 9, 1916.

1,339,942.

Patented May 11, 1920.
4 SHEETS—SHEET 1.

Fig. 1

Inventor
Horace M. Branson
By Cyrus Keller, Attorney

H. M. BRANSON.
BLANK FORM.
APPLICATION FILED MAR. 9, 1916.

1,339,942.

Patented May 11, 1920.
4 SHEETS—SHEET 2.

Fig. 2

Inventor
Horace M. Branson
By Cyrus Kehr
Attorney

H. M. BRANSON.
BLANK FORM.
APPLICATION FILED MAR. 9, 1916.

1,339,942.

Patented May 11, 1920.
4 SHEETS—SHEET 3.

Fig. 3

H. M. BRANSON.
BLANK FORM.
APPLICATION FILED MAR. 9, 1916.

1,339,942.

Patented May 11, 1920.

UNITED STATES PATENT OFFICE.

HORACE MILFORD BRANSON, OF KNOXVILLE, TENNESSEE.

BLANK FORM.

1,339,942.  Specification of Letters Patent.  Patented May 11, 1920.

Application filed March 9, 1916. Serial No. 83,138.

*To all whom it may concern:*

Be it known that I, HORACE MILFORD BRANSON, a citizen of the United States, residing at Knoxville, in the county of Knox and State of Tennessee, have invented a new and useful Improvement in Blank Forms, of which the following is a specification, reference being had to the accompanying drawing.

My improvement relates particularly to blank forms used for recording facts concerning land. The forms are specially adapted for recording facts pertaining to lots or other parcels of land grouped along thoroughfares, prominent boundaries, or streams which are adapted to be treated as axes for such grouping.

The chief factor in the improvement is a principal or primary diagrammatic form which represents an arbitrarily chosen land area and which is adapted to receive entries denoting facts pertaining to said area. For convenience in description, any area represented by said diagram is herein termed a "diagram block." Such area may be a part of a city block or it may comprise portions of more than one city block, or it may comprise undivided acreage.

In said diagram the representation of the thoroughfare, stream, or other factor used as an "axis" may, and ordinarily should, be a part of the area treated by the diagram; and, for the sake of convenience and greater efficiency, the diagram should extend to both sides of the axis, though the diagram can be used for representation at only one side of the axis. For example, if a portion of a street is the axis, lots abutting on both sides of the street should be combined with said portion of the street to constitute the diagram block; but the lots at one side of said street portion may be omitted. Indeed, in the use of my forms, there may be situations in which lots are located at only one side of the street or other factor used as an axis. In some cases a group of lots extend from one street to another. Then representation of those lots may be omitted from the diagram when one or the other of said streets is used for a diagram axis.

Cross streets, streams, and prominent boundaries, or other conspicuous and permanent factors may be used as limits for the arbitrary diagram block in the direction of the length of the axis. In the absence of such factors, artificial limits for such diagram block may be arbitrarily chosen or established.

A large variety of facts may be registered upon said principal or primary form. Other forms (herein termed, "supplemental") included in my invention are usually subordinate to the form already mentioned and are used for recording additional information. As specific uses to which my improvement may be applied, I mention the recording of matter pertaining to dimensions and relative locations of parcels of lands, ownership of such lands, tax assessments and collections, mortgage indebtedness, building permits, telephone connections, electric light connections, gas connections, water works connections, sewer connections, cess pools, vaults and other sanitary features, street and house numbering, fire insurance risks, vital statistics, street and road construction, including side-walks, culverts, etc.

Usually the primary form and one or more of the supplemental forms will be used together, data for which provision is not made on the primary form being placed upon the appropriate supplemental form, and the supplemental form or forms being usually dependent upon the primary forms; or it may be said that the primary form is adapted to carry its own data and to form a base for the supplemental forms. Yet there are specific uses to which the supplemental forms are adapted without the aid of the primary form.

The primary form and any one or more of the supplemental forms may be printed upon the same sheet or upon sheets standing opposite each other in a book. The sheets upon which these forms are printed may be used in loose form or in bound books.

For convenience in description, it is to be understood that, as used herein, "map block" means such survey map as ordinarily constitutes a block on a city map or plat; and that "house number block" means the block or group of numbers applied to houses on any street between two cross streets, according to what is termed the decimal system of house numbering, a new hundred starting at each cross street.

For convenience in description, it is also to be understood that the word, "space," as used in the following description and claims designates a limited or defined area on the form or diagram on which the space is located, the limiting or defining being effected by circumscribing the area with markings or locating said area in definite association with markings, the form constituting a physical structure comprising markings and such limited spaces.

In the accompanying drawings,

Figure 1 illustrates the primary form;

Fig. 2 illustrates a supplemental form intended chiefly for the registration of ownership of the land constituting the diagram block represented by the primary form;

Fig. 3 is another supplemental form intended chiefly for the registration of data pertaining to the assessment and collection of taxes on the land constituting the diagram block represented by the primary form;

Fig. 4 is another supplemental form intended chiefly for the registration of data not provided for by the other forms and including public and semi-public utilities and data pertaining to the public welfare.

Referring first to Fig. 1, the space between the two lines, $a$, represents a portion of a city street upon which street abut lots regarding which entries are to be made on this form. Said lots and said street portion constitute the "diagram block". Between the lines, $a^1$ and $a^2$, is a space representing a portion of a cross street reaching to or extending across the street lying between the lines, $a, a$. Between the lines, $a^3$ and $a^4$, is a space representing a portion of another cross street extending to or across the street lying between the lines, $a, a$. For convenience in description, the street represented by the space between the lines, $a, a$, will be called the major street, while the two cross streets are called minor streets, and the major street constitutes the axis while minor streets constitute the end boundaries of the diagram block. The representations of minor streets are laterals to the axis.

Above and below the lines, $a, a$, horizontal lines, $a^5$, extend from the line, $a^2$, to the line $a^3$. Nine such lines are shown; but the number may be varied. Upright lines, $a^6$, extend from the upper line, $a$, to the uppermost line, $a^5$, and from the lower line, $a$, to the lowermost line, $a^5$. Said lines, $a^6$, are spaced approximately equi-distant from each other, excepting at the middle of the space between the line, $a^2$, and the line, $a^3$. At such middle, the lines, $a^6$, are placed far enough from each other to leave a space between them which is wide relative to the spaces between others of the lines, $a^6$. Said middle lines, $a^6$, and the horizontal lines, $a^5$, together form a column of relatively long, horizontal, rectangular spaces which are to receive words and figures similar to those shown by the drawings. At each side of the middle, the lines, $a^6$, and the horizontal lines, $a^5$, form ten columns of relatively small rectangular spaces. Above the axial space (the major street space), the upper space in each of said columns bears a letter or number, and below said axial space, the lower space in each of said columns bears a letter or number. Thus we have above and below the axis two equal "sections" of rectangular spaces, and there are in all four such sections. The upper, left-hand section may be designated section, A; the upper right-hand section may be designated section, B; the lower left-hand section may be designated section, C; and the lower right-hand section may be designated section, D. In each section, the first and the last of the columns bears a letter which designates the section. For example, the upper left-hand section has the letter, "A", in the first and last of said columns; while in the upper right-hand section the first and last of said columns contain the letter, "B"; and in the lower left-hand section, the first and last of said columns contain the letter, "C"; while in the lower right-hand section, the first and last of said spaces, contain the letter, "D". Said letters are used in this manner for identifying the columns in which they stand and for identifying said sections as they stand upon this form and also for indicating relation between this form and the supplemental form.

In each of said sections, the spaces between the section letters are numbered, "2, 3, 4, 5, 6, 7, 8, 9", the numbering beginning at the outer portion of the form and extending toward the middle. There are ten such spaces in each of the sections, and in every section the outer section letter stands in lieu of the numeral, 1, while the inner section letter stands for the numeral, 10. This makes provision for noting twenty pieces of land at one side of the diagram axis. When more pieces of land are to be noted, the number of columns in the sections is increased.

Above the uppermost line, $a^5$, and below the lowermost line, $a^5$, is a space, $a^7$, extending from the line, $a^2$, to the line, $a^3$, and having in its left hand portion the designation, "Alley." Above the upper space, $a^7$, is a horizontal row of spaces, $a^8$, receiving the designations, "Civil dist.," "Range," "Township," "Section," "Half sec.," "Quar. sec.," "Map blocks," "Addition," "Subdivision," and "Ward." In the upper, right-hand corner of the form is a space, $a^9$, bearing the designation, "Ho. No. Block." At the left of said space, $a^9$, are two superposed, oblong spaces, $a^{10}$ and $a^{11}$, separated by "and." At the left of said spaces is the word, "Between." At the left of said word is a horizontal, elongated space, $a^{12}$, at the left of which are the words, "For both sides of."

On a portion of the left-hand minor street space above the axis are the words, "Name of cross street on left;" and on a portion of the minor street space above the axis are the words, "Name of cross street on right." At the middle of each alley space, $a^7$, is placed "H—L." In the middle column of elongated, rectangular spaces above the axis are designations as follows, beginning with the lower space: "1 House No.," "2 House No.," "1 House, size, kind," "2 House, size, kind," "Rear end, feet," "Depth, feet," "Frontage, feet," "Lot Nos. (red ink)" and "Location Nos." Below the axis, said designations are correspondingly inserted, but in reverse order, excepting that "frontage, feet" and "rear end, feet" are transposed.

In the portion of the axis between the lines, $a^1$ and $a^2$, and between the lines, $a^3$ and $a^4$, is the designation, "Contour," and above each such designation, is the letter "H" and below each such designation is the letter "L." At the inner side of each line, $a^2$ and $a^3$, and opposite the adjacent letter, "H" and the adjacent letter, "L," is a large dot.

Extending horizontally through the middle of the axial space from the line, $a^2$, to the line, $a^3$, are the words: "This roadbed ungraded — Rock — Sand — Gravel — Macadam — Bituminous — Stone — Brick — Cement — Asphalt — Wood block." Above said line of words midway between the lines, $a^2$ and $a^3$, is the designation, "H—L;" and below said designation and below said line of words is the designation, "L—H."

Directly below the axial space, the designation, "Block lengths" is placed in the left-hand minor street space; and immediately below said designation is a space, $a^{13}$. Immediately below said space is the designation, "Ft." Below said designation are the words, "North, East, West, South," one being placed above the other. Immediately below the axial space, "Frontage lengths" is placed in the right-hand minor street space; and immediately below said designation is a space, $a^{14}$; and immediately below said space is "Ft." Below the last-mentioned designation are the words, "South, West, East, North," one being placed above the other, said group of names standing horizontally opposite the group of the same names placed correspondingly, but in reverse order, in the left-hand portion of the form.

Midway between the ends of each alley space, $a^7$, is placed, "H—L."

The form is used as follows:

The number of the "house-number block" is placed in the space, $a^9$, in the upper right-hand corner of the form.

The name of the street represented by the axis is put into the space, $a^{12}$, at the top of the form. The name of the cross street represented by the left-hand minor street space is put into the space, $a^{10}$, at the upper portion of the form; and the name of the cross street represented by the right-hand minor street space is written into the space, $a^{11}$.

Appropriate designations are placed into the spaces, $a^8$. Into the space, $a^8$, above "Map blocks" there is to be placed a designation of the map or sub-division block or blocks in which lies the area to be represented by the diagram—such area being herein termed the "Diagram block." The direction of the street represented by the axis is indicated approximately by checking the appropriate one of the words, "North, East, South, West," at the left-hand side of the form and at the right-hand side of the form.

For example, if the course of said street is from east to west, the word, "East," is checked at the left-hand side of the form and the word, "West," is checked at the right-hand margin of the form; and if the course is south-west, "North" and "East" are checked at the left-hand, and "South" and "West" are checked at the right-hand margin of the form. The lowest house numbers in the "house-number block" are to be arbitrarily placed at the left-hand side of the form, regardless of the direction of the axis relative to the cardinal points, it being remembered that this form is not a map and is not subject to the rule which places the top of a map toward the north. The top of this form is toward the south when the house numbers range serially from east to west; and when the house numbers range serially from south to north, the top of the form is toward the west. In other words, it is assumed that the sheet bearing the form is so turned upon the part of a map which represents the corresponding diagram block as to bring the left hand part of the form to the lowest house numbers of the diagram block.

In the spaces $a^8$, are written the respective numbers or other designations of the civil district, range, township, section, half section, quarter section, sub-section, map block, addition, sub-division, and ward, so far as these designations are applicable to the area to be registered. In each space, $a^7$, is placed the name or number of the alley, lane, street, or other thoroughfare, if such there be, occupying, geographically, the position indicated by said space relative to the street respesented by the axis. In each of said spaces, a check mark may be placed adjacent the "H" or the "L" or a circle may be placed around said letter to indicate whether the adjacent ground is relatively high or low. Additional letters "H" and "L" may be placed at chosen points along the length of either of said spaces, $a^7$, to indicate approximately the elevation of the ground represented by said space.

In the axial space, the word or words indicating the character of the road bed are to be appropriately marked, as by underscoring or encircling or checking.

In the same space, the approximate longitudinal contour of said street may be indicated by drawing a line from left to right through said space, the height of said line indicating approximately the relative elevation of the middle line of said street at various points. The large dots adjacent the lines, $a^2$ and $a^3$, serve as guides for indicating high and low in the location of said contour line.

For indicating transverse elevation of said street, "H—L" and "L—H" are used. For example, if one side of the street is higher than the other, the "H" on that side may be underscored or encircled or otherwise marked, or the "L" on the other side may be correspondingly marked. Additional letters, "H" or "L", may be placed at various points for indicating such transverse elevation when the cross section is not balanced. Furthermore, numbers representing actual elevations may be placed into this axial space and also into the spaces, $a^7$, if such numbers are available. In the space, $a^{13}$, are written numbers representing the total lengths of the diagram block at each side of the street represented by the axis, the lengths of the upper side being written above and the lengths of the lower side being written below in said space.

Into the space, $a^{14}$, at the right of the form are put two numbers, one representing the aggregate lot frontage on the upper side of the axis and the other representing the aggregate lot frontage on the lower side of the axis. These numbers, when ascertained by adding lot frontages, must correspond to the numbers placed in the space, $a^{13}$. If making such additions does not bring such equality, there is error somewhere which must be ascertained.

In each section of this portion of the form, any of the ten columns may be used to represent a lot fronting on the corresponding side of the axis of the diagram. But the lot bordering on a cross street is entered in the corresponding outer column, and the next lot going toward the middle of the diagram block is entered in the next column, and so on until all the lots have been entered, a portion of the columns midway between the ends of the axis remaining vacant if the total number of lots at that side of the axis is less than twenty. When the entries have been thus made, the columns are identified with the lots by counting from each end of the diagram block. For example, if the lot numbers in section, B, of the diagram are 18, 17, 16, and 15, reading from the right, lot 16 is identified by the number, "16", and also by the symbol "B3", and lot 15 is identified by the number "15" and also by the symbol "B4". There is advantage in this, because in nearly all cases it is easier to identify such a lot by reference to or counting or measuring from the nearest cross street. In many cases owners and others are able to designate the position of a lot with reference to the nearest cross street, while they are unable to give the number of such lot when counting from the other cross street. When actual measurement is needed, it is easier to begin at the nearest cross street or other factor used as an end boundary of the diagram block. Thus, in the completed diagram, the proper relation of each lot to the nearest cross street or lateral is diagrammatically indicated. When lot numbers are omitted from a portion of the columns midway between the ends of the axis, as above stated, those columns will also not receive house numbers.

In reading this form, it may be taken as understood that each location symbol comprises the appropriate section letter and also the location lot number, thus: A1, A2, A3, A4, etc.

In each column representing a lot is entered data relating to said lot as indicated by the designation in the middle column of the form. For example, if there is no house on the first lot of section, "A," the space in the column, "A" opposite "1 House No." is left blank. If there is one house on said lot, the street number of said house is written into said space. If there are two houses on said lot, the higher house number is written into the second or "2 House No." space. Into the next higher space are put characters indicating the size and kind of the first house, if there be a house. If there is a second house, the size and kind are indicated in the next higher space. For indicating the house, symbols may be used as shown in section, "A," of the upper portion of the form. For example, "1 F 3" means one story frame three rooms; "2 F 6" means two-story frame six rooms; "2 B 6" means two-story brick six rooms; "2 P 5" means two-story pebble-dash five rooms; "2 C 8" means two-story concrete eight rooms. If the building is other than a residence, this may be indicated by inserting the name, as for example, "Store."

The next higher space, in the same column receives a number designating the width of the rear end of the lot, as, for example, "50." The next higher space receives a number designating the depth of the lot, as "175." If the two sides of the lot are of unequal length, numbers representing both may be inserted in the same space. In the next higher space is inserted a number representing the frontage, as, for example, "60." In the next higher space is placed the number which the lot bears on the plat of the sub-division in which the lot is located, as for example, "7." These lot numbers are preferably written in a color differing from the color of the location numbers and letters in the spaces immediately above the spaces occupied by the lot numbers.

In the portion of the form next below the axis, the frontage, depth, rear width, and lot numbers are inserted as indicated by the designations in the middle column.

Streams and springs may also be indicated on the diagram. This is illustrated on the sections, B and D, of Fig. 1, "S" being a stream extending across lots, B5, B6, B7, B8, B9, D8, D7, and D6, and "s" being a spring on the middle of lot, B6, and having a branch extending across lot, B7, into the creek, S. The arrow indicates that the flow is from the section, B, to the section, D. It will be observed that by this means the position of the stream or spring, with reference to the ends of the lots, may be shown. In the case shown by Fig. 1, the stream, S, crosses the rear end of lot, B5, and runs diagonally so as to cross other lots farther from the rear end and until the stream passes into the street through the front of lot, B9. For entering this feature, it is preferable to use blue ink to represent water and also to distinguish from other entries.

For various reasons, the representation of topography on this diagram, is important. This is particularly the case with reference to taxation. For example, in the case above mentioned, it is to be inferred that the lots crossed by the stream, S, are of less value than are other lots represented in this diagram block.

When lateral thoroughfares are not available for use as ends of the diagram block, boundaries between parcels of land may be substituted or stations may be arbitrarily established on the axis and lateral lines extended from said stations. In some cases a stream may be used as a lateral at an end of the diagram block.

When there is an alley within a diagram block and lateral to the axis, the corresponding lot space is assigned to said alley, suitable entry of said alley being made in said space and the width of the alley being counted as though the alley were a lot. And when a stream is located between lots, it is to be similarly treated. It is to be observed that in these cases the alley or the stream is not a part of a lot but places a land area between two lots and that such land area must be given its representation on the form.

When the entries have been made on the form illustrated by Fig. 1, so far as entries are needed for the land area under consideration, the registration of said land is complete for that time and for future time, with the exception of buildings erected on said lands subsequent to such registration. The boundaries of the groups of lots and the relative locations of the individual lots are all fixed, and for the purposes of showing ownership and for taxation and for public improvement of various kinds, this registration is permanent and need not be repeated from year to year, as is now the custom everywhere so far as I am informed.

The form shown by Fig. 2, is chiefly for the registration of the owner or owners of the lands shown by the form which constitutes Fig. 1. Fig. 2 also receives entries of dates of buildings erected on the "diagram block" after an arbitrarily-chosen date subsequent to which entries in the form of Fig. 1 do not extend. Fig. 2 also receives references to the tax book (when a tax book distinct from my form is used) and also receives entries indicating whether any given lot is occupied by the owner or by a tenant. However, the main feature of this portion of the form is the registration of ownership, including a limited number of changes in ownership. As shown in Fig. 2 this form is provided with spacing for the registration of four successive owners.

Horizontal lines, $a^{15}$, $a^{16}$, $a^{17}$, $a^{18}$, and $a^{19}$, divide this form into four horizontal sections corresponding to the sections, A, B, C, and D, of Fig. 1, and these sections of Fig. 2 are correspondingly called, A, B, C, and D. To aid in making the sections apparent to the eye, said horizontal lines are made relatively heavy.

Horizontal lines, $a^{20}$, divide each of the sections, A, B, C, and D, into ten horizontal spaces, and the location designations, "A, 2, 3, 4, 5, 6, 7, 8, 9, A" are placed serially in the first of said sections; and in the other sections the location designations of sections, B, C, and D, of Fig. 1 are similarly entered. Thus each horizontal space in Fig. 2 is connected or related with a lot column in one of the four sections of Fig. 1, such space in Fig. 2 becoming an auxiliary to or adjunct of the column in Fig. 1.

Above the line, $a^{15}$, is another horizontal line, $a^{21}$, forming the upper margin of the form.

Upright lines, $a^{22}$, extending from the line, $a^{21}$, to the line, $a^{19}$, form upright column spaces. In the portions of these column spaces which are located between the line, $a^{15}$, and the line, $a^{21}$, are placed designations as follows, reading from left to right: "Date new buildings. Acres," "Location Nos.", "Lot Nos.", "House Nos.", "Present owner, year 19—.", "Tax book", "P'g.", "Line", "To new owner", "Transfer date", "To new owner", "Transfer Date", "To new owner", "Transfer date", "O T". The lot location letters and numbers are put into the column having the heading, "Locations Nos."

This form is used as follows: The first space below the line, $a^{15}$, represents the first lot in section, A, (the upper left-hand section) of Fig. 1. If said lot is large enough to make acreage, the area in acres is noted in the first column. If a building is erected on said lot subsequent to the date with reference to which the last tax assessment was made, the date of such new building is also entered in the first column. The number which the lot bears on the map or plat is put into the third column, if the lot has a number. If it has no number, this is indicated by placing a cipher or a horizontal line or any other symbol into said column.

The house number is placed into the next space. If there is more than one number, all are entered together.

Figure 3:
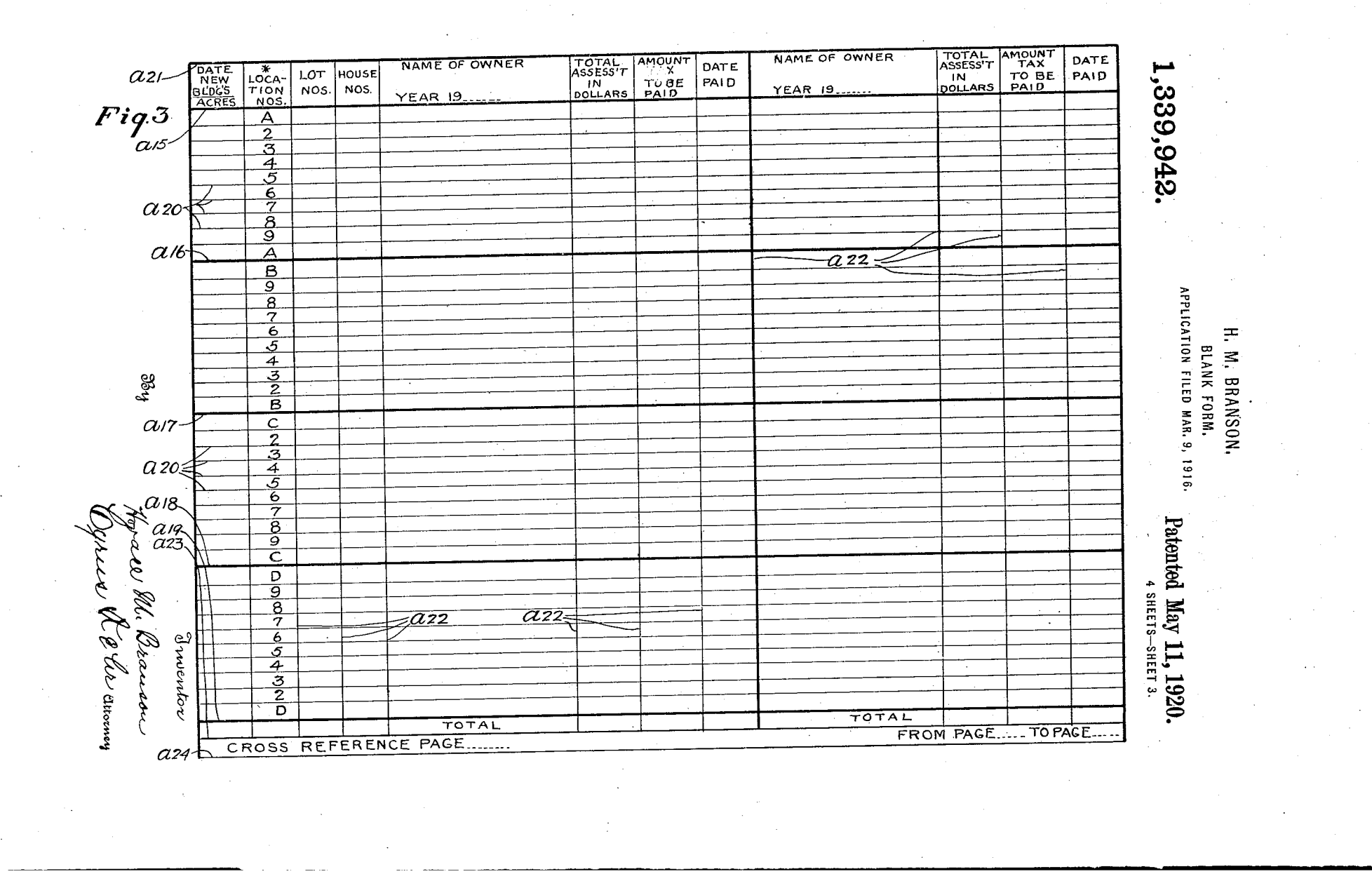

Into the next column is put the name of the owner, and in the head of said column is entered the date of such entry. Into the next column is entered the designation of a page of a tax book; and in the next column is entered the designation of a line of said page, said line containing a tax entry relating to said lot. But these entries are made only when some ordinary tax book is used and the form illustrated herein by Fig. 3 is not used. All other columns, excepting the last, are left blank until such time as the name of a new owner is to be entered. If a new owner acquires said lot, his name is entered into the first column marked, "To new owner". Then the date of transfer to said owner is entered into the next column. These columns provide spaces for indicating two more such transfers.

The last column contains the letters, "O T". If the lot is occupied by the owner, the "O" is checked or otherwise marked to indicate that fact. If a tenant occupies said lot, the "T" is correspondingly marked. If the tenant should become the owner, the checking at the "T" may be canceled and checking applied to the "O". But when there is no house on the lot, the occupancy symbols are not checked and the house number space is left blank.

In this manner, the ownership of all the lots registered on the arbitrary diagram block represented by Fig. 1 is entered on the form represented by Fig. 2.

The tax form is represented by Fig. 3. This form is divided into four horizontal sections by lines, $a^{15}$, $a^{16}$, $a^{17}$, $a^{18}$, $a^{19}$, as is done in Fig. 2. Above the line, $a^{15}$, is another horizontal line, $a^{21}$. Minor horizontal lines, $a^{20}$, divide each section into ten horizontal spaces, as is done in Fig. 2.

Below the line, $a^{19}$, are two horizontal lines, $a^{23}$ and $a^{24}$. Upright lines, $a^{22}$, extend from the line, $a^{21}$, to the line, $a^{23}$, and form upright columns. In the portions of said columns lying between the lines, $a^{15}$, and $a^{21}$ are designations as follows, leading from the left: "Date new buildings. Acres", "Location Nos.", "Lot Nos.", "House Nos.", "Name of owner year 19—", "Total assessment in dollars", "Amount tax to be paid", "Date paid", "Name of owner year 19—", "Total assessment in dollars", "Amount of tax to be paid", "Date paid".

In the first four columns entries regarding new buildings, acreage, location designations, lot numbers, and house numbers are entered as described relative to the first four columns of Fig. 2.

In the head of the next column is entered the year for which taxes are assessed. In the other spaces of said column are entered the names of the owners of the respective lots. The total assessments of the lots are entered in the next column. The amount of taxes to be paid on each lot are entered in the next column. The date of payment of the tax for any lot is entered in the appropriate lot space in the next column. The next four columns are duplicates of the last four columns and are used for repeating entries pertaining to taxes for the next succeeding year, the date of the year being indicated in the head of the owner column. It is to be noted that this form is complete and workable for one year without the last four columns. It is also to be noted that these four columns may be repeated indefinitely so as to make the form suitable to receive entries pertaining to taxation for a series of years.

In the space between lines, $a^{24}$ and $a^{23}$, at the lower end of the form, may be entered references to other pages in the tax book relating to the same lands.

The tax book comprising forms as illustrated by Fig. 3, will have page numbers identical with the page numbers of the book comprising the ownership forms illustrated by Fig. 2.

Other forms similar to the ownership form illustrated by Fig. 2 and the tax form illustrated by Fig. 3, and divided by horizontal lines into sections, A, B, C, and D, may be used for making other entries of analogous nature relating to the lands to which the arbitrary diagram block represented by Fig. 1 relates.

Figure 4:
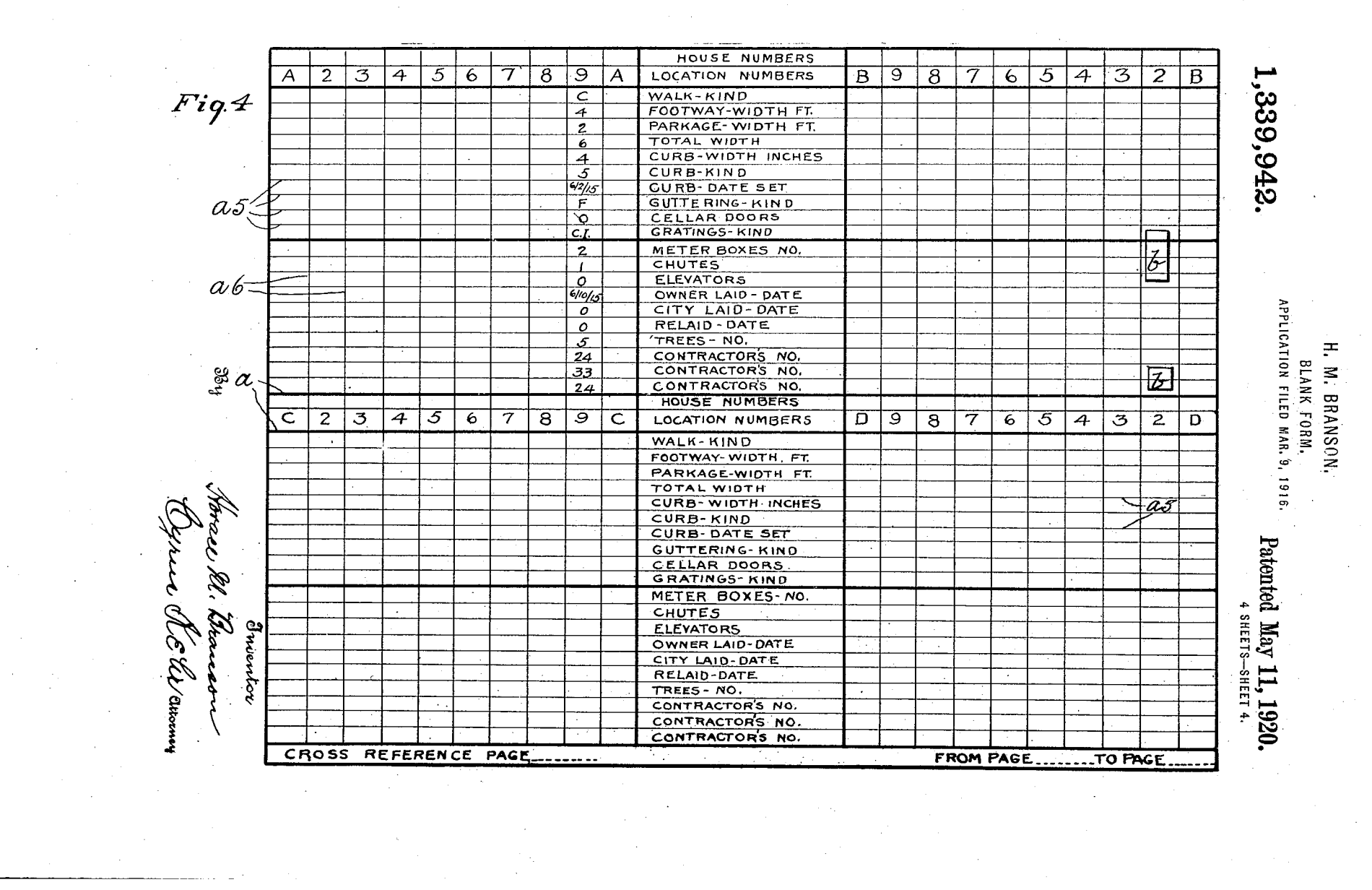

The form illustrated by Fig. 4 is for the recording of a variety of information including information concerning public and semi-public improvements on the area represented by the form which constitutes Fig. 1. Said form is divided into four sections similar to the sections in Fig. 1. At the middle of said form is a wide column extending from the upper end to the lower end of the form. At each side of said middle column are ten columns extending from the upper edge to the lower edge of the form, the same as the columns in Fig. 1; and these columns are designated by the location letters and numbers just as is done in Fig. 1, excepting that as to the two lower sections these letters and numbers are placed in the axial space of the form.

Horizontal lines, $a^5$, extending across the form make twenty horizontal spaces between the upper location symbols and the lower location symbols and another twenty horizontal spaces between the lower location symbols and the lower line, $a^5$.

In the upper half of the wide middle column, designations pertaining to public and semi-public utilities are placed into the spaces formed by the lines, $a^5$. Since there are twenty such spaces, twenty such designations may be entered. In printing the book, these spaces may be left blank in order that the user of the form may insert the designations suited to his particular work. In the lower half of said middle column, said designations are repeated. Obviously the kind and number of these designations may be varied. With the twenty designations entered as above stated, this form is adapted to making entries for each lot relative to any or all of the twenty items represented by these designations. For making these entries in the lot columns suitable symbols may be used, as, for example, such as are shown in the column for lot, 9, in section, A (the upper left-hand section) in Fig. 4, "C" being for concrete, "S" being for stone, the "F" being for flag, "C. I." being for cast iron, and the ciphers indicating absence of the items named. When a contractor has done any work in front of or on a lot, his register number may be placed into the column for that lot.

The form illustrated by Fig. 1 and the ownership form illustrated by Fig. 2 may be put upon the same page, the ownership form being preferably placed below; or these two forms may be placed on opposite pages. If they are placed upon the same page, the tax form may be placed upon the opposing page of the book.

In the land parcel spaces to which the arbitrary location symbols are related, the position of buildings on the land parcels represented by said spaces may be indicated by placing any representation of such buildings in said spaces approximately proportionally to the positions of said buildings on the corresponding land parcels. Such buildings may be represented by any desired symbol. In the spaces, $D^1$ and $D^2$, of Fig. 1, and in the space, $B^2$, of Fig. 4, such representation is made by using a parallelogram, $b$, for such a symbol. In these cases, such representation means that on the lots represented by said spaces there are houses occupying approximately proportionally the positions on the lots that the symbols occupy on said spaces. If so desired, these building symbols may be made large or small to indicate approximately the size of the buildings. In connection with work on various utilities, such as water supply, gas supply, sewerage, etc., it is desirable to know the distance from the street to a building. In connection with fire insurance, it is also desirable to know the position of buildings relative to each other and relative to the street line and particularly relative to hydrants in streets or alleys.

I claim as my invention:

1. In the art herein described, a form having two groups of symbols, the symbols of each group forming a row and ranging serially toward the other group, said form having space for the entry of data in relation individually to said symbols and pertaining to parcels of land, and said form also having appropriately-designated space for the entry of data indicating collectively the geographical location of said parcels of land, substantially as described.

2. In the art herein described, a form having an axis and having a group of symbols arranged serially, said group being at one side of and adjacent said axis, and said form having entry space in relation to said symbols, and said form bearing designation suggesting the placing of land parcel numbers in relation to said symbols, whereby there are applied to each land parcel two symbols, one being the location symbol of the diagram block and the other being the number which said land parcel bears on its map block, substantially as described.

3. In the art herein described, a form having markings arranging the form into a pair of sections, each section having a row of symbols ranging serially toward the other row, a column located between and extending laterally from said rows and adapted to receive a group of designations perpendicular to said rows, and spaces at each side of said space and lateral to said groups of symbols, substantially as described.

4. In the art herein described, a diagram form having an axial space containing designations for indicating physical features of land represented by said space, and said form having laterals extending from said axial space, and said form having two groups of symbols, said groups being at one side of and adjacent said axial space and between said laterals and the symbols of each group forming a row and ranging serially toward the other group, and said form having space for the entry of data in relation individually to said symbols and pertaining to parcels of land located beside the land represented by said axial space, substantially as described.

5. In the art herein described, a diagram form comprising an axis and four land parcel sections, two of said sections being located at one side of and adjacent said axis and the other two being located at the opposite side of and adjacent said axis, each of said sections having location symbols ranging serially toward the companion section at the same side of said axis, and each of said sections having space for the entry of data in relation to said symbols, and said form having devices adapted to be marked to indicate the direction of the course represented by said axis, substantially as described.

6. In the art herein described, the combination of a primary form and a supplemental form, the primary form comprising a group of spaces of arbitrarily-chosen width and bearing arbitrary symbols, and said supplemental form having spaces corresponding in number to the spaces of the primary form and bearing the same arbitrary symbols and being in relation with a plurality of duplicate designations, each applicable to any of said spaces and indicating matter to be inserted in said spaces, substantially as described.

7. In the art herein described, the combination of a primary form and a supplemental form, the primary form comprising an axis and spaces of arbitrarily-chosen width and extending laterally from the axis and bearing arbitrary symbols, and said form having designations related to said spaces for guidance in the insertion of data in said spaces relating to parcels of land, whereby a permanent record of location and physical features of said parcels of land is made, and said supplemental form having spaces corresponding to the lateral spaces of the primary form and bearing the same arbitrary symbols, and said supplemental form bearing designations for guidance in entering data regarding ownership of said parcels of land, substantially as described.

8. In the art herein described, the combination of a primary form and a supplemental form, the primary form comprising a series of arbitrarily-chosen location symbols, and said supplemental form bearing the same arbitrary symbols and having entry space located in relation to said symbols, and said supplemental form bearing designations for guidance in entering data in relation to said symbols and pertaining to taxation of parcels of land represented by said location symbols, substantially as described.

9. In the art herein described, the combination of a primary diagram form and a supplemental form, the primary form comprising a series of arbitrary symbols and entry spaces adjacent said symbols, and said supplemental form also bearing said arbitrary symbols and having space adjacent said symbols, and said supplemental form having designations indicating repetition of data in relation with any of said symbols, substantially as described.

10. In the art herein described, the combination of a primary diagram form and a supplemental diagram form, said two forms being related to each other by identical serial symbols applied to both said forms, and the primary form having spaces and devices adapting said form to the registration of relatively permanent data relating to a group of land parcels, and the supplemental form bearing spaces and devices adapting said form to bear data pertaining to relatively temporary facts concerning said land parcels, substantially as described.

In testimony whereof I have signed my name this 26th day of February, in the year one thousand nine hundred and sixteen.

HORACE MILFORD BRANSON.